March 5, 1957 V. G. KLEIN ET AL 2,783,713
INJECTORS
Filed Nov. 10, 1951
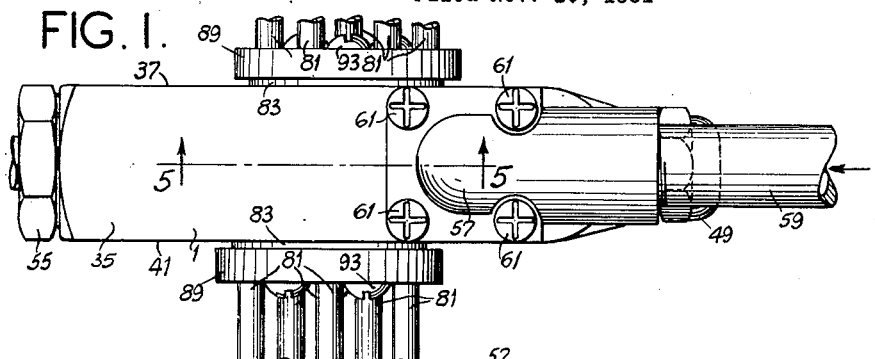
FIG. 1.
FIG. 2.
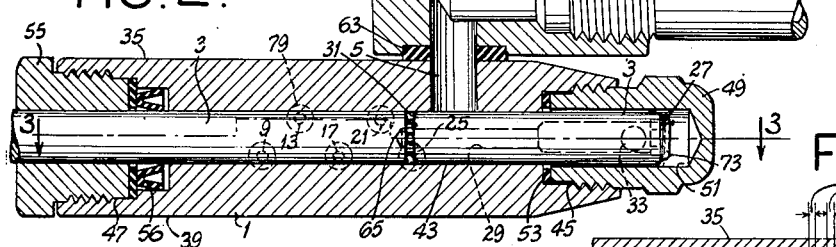
FIG. 5.
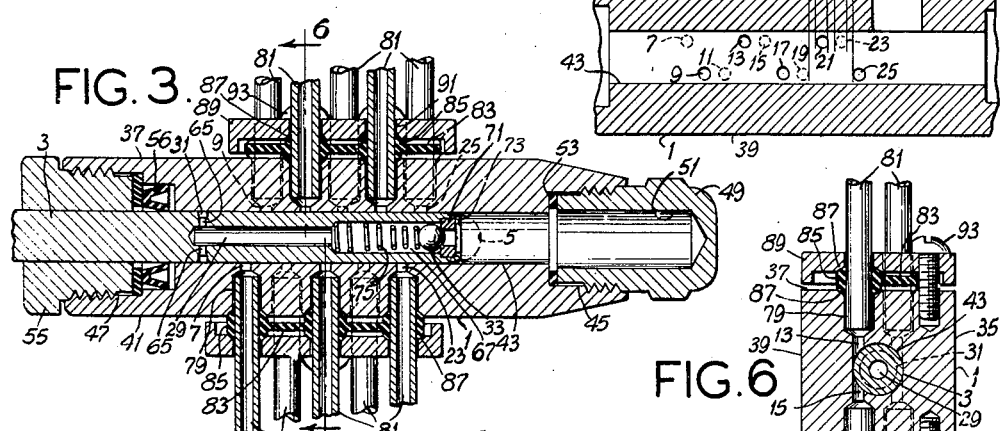
FIG. 3.
FIG. 6.
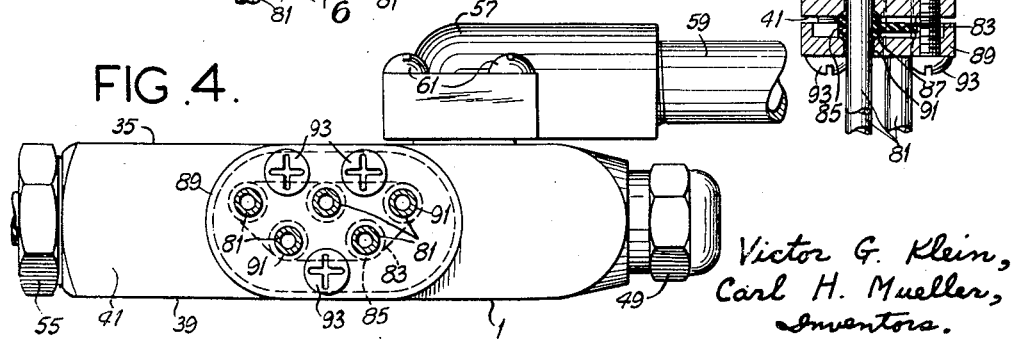
FIG. 4.
Victor G. Klein,
Carl H. Mueller,
Inventors.
Koenig and Pope,
Attorneys.

United States Patent Office 2,783,713
Patented Mar. 5, 1957

2,783,713
INJECTORS

Victor G. Klein, Defiance, and Carl H. Mueller, St. Louis, Mo., assignors to The McNeil Machine & Engineering Company, Akron, Ohio, a corporation of Ohio Application November 10, 1951, Serial No. 255,828

1 Claim. (Cl. 103—2)

This invention relates to injectors, and more particularly to lubricant injectors.

This application is a continuation-in-part of our co-pending co-assigned application entitled Injector, Serial No. 240,382, filed August 4, 1951 now matured into Patent No. 2,686,476.

Among the several objects of the invention may be noted the provision of an injector, and particularly a lubricant injector of the same general type as that disclosed in our aforesaid copending application for delivering measured charges of lubricant individually to a plurality of lubrication points upon a single cycle of operation, of improved construction eliminating any necessity for using any more than one outlet check valve. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawing, in which one of various possible embodiments of the invention is illustrated, Fig. 1 is a plan view of an injector of this invention;

Fig. 2 is a vertical longitudinal section of Fig. 1;

Fig. 3 is a longitudinal section at right angles to that of Fig. 2 taken on line 3—3 of Fig. 2, and illustrating a plunger of the injector in a different position from that shown in Fig. 2;

Fig. 4 is a side elevation of Fig. 1;

Fig. 5 is a diagrammatic section taken on line 5—5 of Fig. 1 illustrating the location of certain ports; and Fig. 6 is a transverse section taken on line 6—6 of Fig. 3.

Similar reference characters indicate corresponding parts throughout the several views of the drawing.

Referring to the drawing, an injector constructed in accordance with this invention is shown to comprise a cylinder 1 closed at one end, this end being its right end as illustrated. A plunger 3 is movable in the cylinder toward and away from its closed end. The cylinder has a lateral inlet port 5 spaced from its closed end, and a series of ten longitudinally spaced lateral outlet ports 7, 9, 11, 13, 15, 17, 19, 21, 23 and 25 between its other end and the inlet port 5. The working end of the plunger toward the closed end of the cylinder is designated 27. The plunger is made hollow for some distance from its working end 27 to provide a longitudinal passage 29 for communication from the space in the cylinder between the working end of the plunger and the closed end of the cylinder to a lateral port 31 in the plunger spaced from its working end 27. The length of the passage 29 is greater than the longitudinal extent of the series of cylinder ports. In the passage 29 is a ball check valve 33 adapted to open upon movement of the plunger toward the closed end of the cylinder. Fig. 3 illustrates the plunger in a charging position, wherein its working end 27 is retracted past the inlet port 5, and the plunger is movable from this charging position toward the closed end of the cylinder through a pressure stroke successively to force out individual charges through the outlet ports 7 to 25 as the lateral plunger port 31 passes the outlet ports.

More particularly, the cylinder 1 comprises an elongate cylinder block of generally square cross section, thereby having four flat sides 35, 37, 39 and 41, and having a central longitudinal bore 43 with counterbores 45 and 47 at the right and left ends of the bore. The right end of the cylinder is closed by a hexagonal head plug 49 threaded in the right counterbore 45. The plug has a closed-end bore 51 forming a continuation of the bore 43. Packing 53 is compressed between the end of the plug and the shoulder at the inner end of the counterbore 45 for sealing purposes. The plunger extends out of the left end of the cylinder through a gland nut 55 threaded in the left counterbore 47. The nut holds in place packing 56.

The inlet port 5 leads laterally into the bore 43 from the side 35 of the cylinder 1. An elbow fitting 57 for connection of a lubricant supply line 59 for supplying lubricant to the injector through the inlet port is secured on the side 35 of the cylinder 1 by screws 61. The cylinder and fitting have four screw holes located on the corners of a square so that the fitting may be oriented in any one of four angular positions. Packing 63 is compressed between the fitting and the side 35. The line 59, for example, may lead to the injector from an elevated oil reservoir for gravity feed of oil to the injector. The plunger 3 has a close sliding fit in the bore 43. The lateral port 31 in the plunger is formed as an annular peripheral groove with radial openings 65 from the passage 29 to the groove. The passage 29 is formed by boring the plunger, then counterboring to form a valve chamber 67. A valve seat 71 is fitted in a short counterbore at the outer end of chamber 67 and held therein by peening over the end of the plunger as indicated at 73. This is accomplished after insertion of the ball 33 and a spring 75 which reacts from the shoulder at the inner end of the valve chamber 67 to bias the ball toward the valve seat 71.

The successive outlet ports 7 to 25 are successively angularly offset. Five of the outlet ports are located in one side of the cylinder, and the remaining five are located in the opposite side of the cylinder. The side 39 of the cylinder opposite the inlet port 5 is completely closed. As shown herein, the outlet ports 9, 13, 17, 21 and 25 lead laterally out of the bore 43 to the side 37 of the cylinder. The outlet ports 7, 11, 15, 19 and 23 lead laterally out of the bore 43 to the side 41 of the cylinder. Each outlet port is counterbored at its outer end to form a socket for receiving the end of a lubricant delivery line. The sockets are all designated by the reference character 79, and the delivery lines (tubes) are all designated by the reference character 81. Outlet ports 9, 13, 17, 21 and 25 are staggered, the ports 9, 17 and 25 and the ports 13 and 21 being located in two different rows in the side 37 of the cylinder; and, similarly, outlet ports 7, 11, 15 19 and 23 are staggered, the ports 11, 19 and 25 and the ports 15 and 23 being arranged in two different rows in the side 41 of the cylinder.

The means used in conjunction with this invention for connecting the individual lubricant delivery lines to the cylinder and for packing the connections to prevent leakage is best illustrated in Figs. 3, 4 and 6. This means constitutes the subject matter of our divisional application entitled Conduit Coupling and Packing Therefor, Serial No. 314,986, filed October 16, 1952, subsequently abandoned. As shown therein, on each of the sides 37 and 41 of the cylinder, there is used a packing member comprising an integral formation of a web 83 and a plurality of ferrules 85. The number and arrangement of the ferrules corresponds to the number and arrangement of the sockets or openings 79 in one side of the cylinder. The openings through the ferrules are of such size as originally slidably to receive the delivery lines or tubes 81. The ferrules extend on opposite sides of the web 83, so that packing members may be used interchangeably on the opposite sides of the cylinder, and taper toward their outer ends as indicated at 87. The packing member is preferably made of a relatively soft plastic material, such as polyvinylidene chloride, which may be obtained under the trade name Saran. A follower 89 is used with the packing member. This consists of a flanged plate having openings 91 in number and arrangement corresponding to the number and arrangement of ferrules.

In connecting the lubricant lines 81 to the cylinder, the lines are inserted through the openings in the follower 89 and the ferrules 85 of the packing member, and the latter is then applied against the side of the cylinder with the tapered ends of the ferrules toward the cylinder engaged in the sockets for the lubricant lines and the tapered ends of the ferrules away from the cylinder engaged in the openings in the follower. The follower is secured to the cylinder by screws 93, the screws being tightened sufficiently to effect a radial compression of the ferrules into sealing engagement with the lubricant lines.

When the plunger is in the Fig. 3 charging position, lubricant flows from the inlet port 5 directly into the space in the cylinder between the working end 27 of the plunger and the closed end of the cylinder, the lateral port or groove 31 being blocked. The relation of the longitudinal spacing of the successive outlet ports 7 to 25 and of the last outlet port 25 and the inlet port 5 to the width of the groove 31 is such that as the plunger is moved from its charging position toward the closed end of the cylinder through a pressure stroke, the groove 31 comes into communication with the first outlet port 7 as the end 27 of the plunger blocks off the inlet port 5, and then comes into communication with each successive outlet port as it passes out of communication with the preceding outlet port. This is accomplished by making the intervals between the successive outlet ports equal to the width of the groove 31. By "interval" is meant the distance in the longitudinal direction from the trailing edge of any port (its right edge nearest the closed end of the cylinder) to the leading edge (the left edge farthest from the closed end of the cylinder) of the next successive port. These intervals are indicated at X in Fig. 5, each being equal to the width of the groove 31. The distance from the working end 27 of the plunger to the forward (right) edge of the groove 31 is made equal to the distance from the most forward point of the forward (right) edge portion of the inlet port 5 to the most rearward point of the rearward (left) edge portion of the first outlet port 7 so that the groove comes into communication with the first outlet port 7 as the plunger reaches the position where it blocks off the inlet port 5.

When the plunger is driven from its charging position illustrated in Fig. 3 to the right toward the closed end of the cylinder, lubricant is displaced from within the space in the cylinder between the working end 27 of the plunger and the closed end of the cylinder outward through the inlet port 5 until the plunger reaches a position wherein it blocks off the inlet port and wherein the right edge of the groove 31 first encounters the leading (left) edge of the first outlet port 7. Then, as the groove 31 passes by the outlet port 7, the valve 33 opens and a charge of lubricant is forced out from the cylinder through the passage 29, the radial ports 65, the groove 31 and the outlet port 7 in amount determined by the displacement of the plunger as it moves through the complete distance over which the groove 31 is open to the port 7. It will be seen that this distance is equivalent to twice the width of the groove 31.

As the plunger continues its pressure stroke, the right edge of the groove 31 next encounters the leading (left) edge of the next outlet port 9, as the left edge of the groove 31 is cut off from the preceding port 7. Then as the groove 31 passes by the port 9, a charge of lubricant is forced out of the cylinder through the outlet port 9 in amount the same as previously discharged through the port 7. This action is repeated as the groove 31 passes by the remaining outlet ports 11 to 25. Thus, as the plunger is driven through a pressure stroke from its charging position, equal charges are forced out of the cylinder successively through the outlet ports 7 to 25 one after another. Upon return of the plunger to charging position (Fig. 3), the cylinder is recharged with lubricant for the next cycle of operation.

The plunger 3 may be operated manually, mechanically or electrically, as may be desired. Mechanical operation may include actuation by various mechanical movements or by fluid pressure means. The plunger 3 might also be operated by the special cycling mechanism disclosed in our aforesaid patent adapted during a single cycle of operation to move the plunger through a full pressure stroke and return stroke, and then to move the plunger through a partial pressure stroke and return, in case it is desired to deliver more lubricant to some points than to others upon each cycle of operation.

While the specific embodiment of the invention illustrated herein has ten outlet ports, it will be understood that the injector may be constructed with a greater or lesser number of outlet ports as desired. It will also be understood that the principles of the invention may be adaptable to injectors for purposes other than lubrication.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

An injector comprising a cylinder closed at a forward end thereof, a plunger movable in the cylinder toward and away from its forward end, the cylinder having a lateral inlet port spaced from its forward end and a series of longitudinally spaced lateral outlet ports between its other end and the inlet port, the plunger having a lateral port spaced from its forward end and a longitudinal passage for communication from the space in the cylinder between the forward end of the plunger and the forward end of the cylinder to the lateral plunger port, the intervals between the successive outlet ports of the series being equal to the width of the lateral plunger port, the to the distance from the most forward point of the forward edge portion of the lateral plunger port being equal to the distance from the most forward point of the forward edge portion of the inlet port to the most rearward point of the rearward edge portion of the first outlet port of the series, a check valve in said passage at the forward end of the plunger adapted to open upon movement of the plunger toward the forward end of the cylinder, the plunger having a charging position wherein its forward end is retracted past the inlet port for flow into the space in the cylinder between the forward end of the plunger and the forward end of the cylinder, and being movable forward from charging position toward the forward end of the cylinder to block the inlet port at the instant that the plunger port comes into communication with the first oulet port of the series and then successively to force out individual charges through the outlet ports as the lateral plunger port passes the outlet ports.

References Cited in the file of this patent
UNITED STATES PATENTS

| 1,128,643 | Wetmore | Feb. 16, 1915 |
| 1,892,781 | Hoenstine | Jan. 3, 1933 |
| 2,049,487 | Beeh | Aug. 4, 1936 |
| 2,139,155 | Gernandt | Dec. 6, 1938 |
| 2,286,928 | Pipkin | June 16, 1942 |
| 2,360,093 | Ainslie | Oct. 10, 1944 |
| 2,390,393 | Rubly | Dec. 4, 1945 |
| 2,412,532 | Parker | Dec. 10, 1946 |

FOREIGN PATENTS

| 259,660 | Italy | Jan. 2, 1927 |
| 450,025 | Great Britain | July 9, 1936 |